(12) United States Patent
Abe et al.

(10) Patent No.: US 9,944,525 B2
(45) Date of Patent: Apr. 17, 2018

(54) METHOD FOR PRODUCING DIFLUOROPHOSPATE

(71) Applicant: Kanto Denka Kogyo Co., Ltd., Tokyo (JP)

(72) Inventors: Takuro Abe, Gunma (JP); Hiroki Takizawa, Gunma (JP); Teppei Ota, Gunma (JP)

(73) Assignee: KANTO DENKA KOGYO CO., LTD., Tokyo (JP)

( * ) Notice: Subject to any disclaimer, the term of this patent is extended or adjusted under 35 U.S.C. 154(b) by 0 days.

(21) Appl. No.: 15/316,744

(22) PCT Filed: Jul. 8, 2015

(86) PCT No.: PCT/JP2015/069672
§ 371 (c)(1),
(2) Date: Dec. 6, 2016

(87) PCT Pub. No.: WO2016/017389
PCT Pub. Date: Feb. 4, 2016

(65) Prior Publication Data
US 2017/0197834 A1  Jul. 13, 2017

(30) Foreign Application Priority Data

Jul. 31, 2014 (JP) .................. 2014-156128

(51) Int. Cl.
| | | |
|---|---|---|
| *C01B 25/10* | (2006.01) | |
| *C01B 25/455* | (2006.01) | |
| *H01M 10/0525* | (2010.01) | |
| *H01M 10/0567* | (2010.01) | |

(52) U.S. Cl.
CPC ............ *C01B 25/455* (2013.01); *C01B 25/10* (2013.01); *H01M 10/0525* (2013.01); *H01M 10/0567* (2013.01); *H01M 2300/0025* (2013.01)

(58) Field of Classification Search
CPC .............................. C01B 25/10; C01B 25/455
See application file for complete search history.

(56) References Cited

U.S. PATENT DOCUMENTS

| | | |
|---|---|---|
| 3,428,422 A | 2/1969 | Wiesboeck |
| 8,728,657 B2 | 5/2014 | Tsujioka |
| 2016/0090306 A1 | 3/2016 | Kon |

FOREIGN PATENT DOCUMENTS

| | | |
|---|---|---|
| CN | 103259040 A | 8/2013 |
| JP | H-1167270 A | 3/1999 |
| JP | 2005053727 A | 3/2005 |
| JP | 2005219994 A | 8/2005 |
| JP | 2006143572 A | 6/2006 |
| JP | 2008222484 A | 9/2008 |
| JP | 2010155774 | 7/2010 |
| JP | 2014015343 A | 1/2014 |
| WO | 2014196632 A1 | 12/2014 |

OTHER PUBLICATIONS

A. Semmoud et al., Acide Difluorophosphorique Nouvelle Preparation, Journal of Fluorine Chemistry, 1990, 46, 1-6.

*Primary Examiner* — Stuart Hendrickson
(74) *Attorney, Agent, or Firm* — Young & Thompson

(57) ABSTRACT

The purpose of the present invention is to provide a method for easily producing a difluorophosphate using only low-cost starting materials without requiring cumbersome operations. According to the present invention, at least one salt selected from the group consisting of halides, carbonates, borates, phosphates, hydroxides and oxides of an alkali metal, an alkaline earth metal or an onium, at least one phosphorus compound selected from the group consisting of oxychlorides and chlorides of phosphorus, water and hydrogen fluoride are reacted. The above-mentioned purpose is achieved preferably using, as hydrogen fluoride, one substance selected from the group consisting of hydrogen fluoride anhydride, a mixed solution of hydrogen fluoride anhydride and an organic solvent and a mixed gas of hydrogen fluoride anhydride and an inert gas, as a salt used in the reaction, at least one substance selected from the group consisting of halides and carbonates of an alkali metal, and as a phosphorus compound, phosphoryl chloride.

20 Claims, No Drawings

METHOD FOR PRODUCING DIFLUOROPHOSPATE

TECHNICAL FIELD

The present invention relates to a method for producing a difluorophosphate that is expected to be used in a solvent for an electrolyte solution and an additive for a lithium ion secondary battery, an intermediate of a functional material, an intermediate of a drug, and the like.

BACKGROUND ART

Nowadays, lithium ion secondary batteries are in widespread use as power sources for relatively small electronic devices such as mobile phones, video cameras, digital cameras, and notebook computers. Also, in recent years, inexpensive and highly safe large-sized lithium ion secondary batteries for electric automobiles, power tools, and nighttime electric power have been developed and look to be in greater demand in the future. The demand for performance of the lithium ion secondary batteries, which have been diversified and have been increasing in performance, has been increasing. In particular, there has been demand for improvement in power density and energy density to achieve an increase in performance, and for suppression of capacity degradation at high temperatures and low temperatures, improvement in cycle life, and further improvement in safety, to achieve high reliability.

Various attempts have been made to solve the above-mentioned problems, and improvements have been made. As an improvement means, optimization of constituent members of the lithium ion secondary battery including an active material used as a material of a positive electrode or a material of a negative electrode has been examined. An electrolyte solution has also been examined, and proposals have been made that relate to combinations and blend ratios of one or more selected from various solvents in which salts are to be dissolved, such as ethylene carbonate and propylene carbonate, which have a cyclic structure, and dimethyl carbonate and diethyl carbonate, which have a chain structure, combinations and blend ratios of one or more salts to be dissolved as various electrolytes, such as lithium hexafluorophosphate, lithium tetrafluoroborate, and lithium perchlorate, and combinations and blend ratios of additives for improving the above-mentioned characteristics, such as fluoroethylene carbonate and trans-difluoroethylene carbonate.

When such a non-aqueous electrolyte solution for a lithium ion secondary battery is used, degradation and deterioration of the electrolyte solution on the surface of electrodes can be suppressed depending on the combinations and blend ratios of the above-mentioned electrolyte solutions, electrolytes, and additives. This effect becomes a factor in significantly improving the characteristics of the lithium ion secondary battery such as performance and reliability.

Under the circumstances, Patent Literature 1 states that when a non-aqueous electrolyte solution to which at least one selected from the group consisting of lithium monofluorophosphate and lithium difluorophosphate is added as an additive is used, this additive reacts with lithium used as an electrode to form a good-quality coating at a positive electrode interface and a negative electrode interface, and these coatings suppress the contact between active materials in a charged state and an organic solvent and suppress the degradation of the non-aqueous electrolyte solution due to the contact between the active materials and the electrolyte solution, thus improving the preservation characteristic of the battery.

Various methods have been examined and developed as methods for producing a difluorophosphate such as lithium difluorophosphate described above. For example, Patent Literatures 2 to 5 describe methods for producing lithium difluorophosphate using hexafluorophosphate as a raw material.

Patent Literature 2 discloses a method for reacting a borate with lithium hexafluorophosphate, Patent Literature 3 discloses a method for reacting silicon dioxide with lithium hexafluorophosphate, and Patent Literature 4 discloses a method in which lithium difluorophosphate is produced by reacting a carbonate with lithium hexafluorophosphate in a non-aqueous solvent. However, a long time is required for the reactions in all these methods, and thus, from the viewpoint of productivity, it is difficult to say that these methods are useful.

Patent Literature 5 discloses a method in which a halide is added to lithium hexafluorophosphate and water, and then they are reacted in a non-aqueous solvent to produce lithium difluorophosphate. However, precise reaction control is required to stop the reaction at the time when lithium difluorophosphate, which is a target product, is obtained, and in many cases, a monofluorophosphate and lithium phosphate are produced as by-products due to an excessive reaction.

Patent Literature 6 discloses a method in which a difluorophosphate is produced by reacting a phosphorus oxyacid, a hexafluorophosphate, and an alkali salt in the presence of hydrogen fluoride. Although the hexafluorophosphate is used as a scavenger, plenty of water is produced as a by-product in this reaction, and therefore, in many cases, a monofluorophosphate is produced as a by-product due to an excessive reaction. Furthermore, the comparative example in this patent describes a problem in that use of no hexafluorophosphate as a scavenger significantly reduces the purity.

Also, in Patent Literatures 2 to 6, there is a problem in that production cost is high due to using lithium hexafluorophosphate as a starting raw material.

On the other hand, as a method using no lithium hexafluorophosphate as a raw material, Patent Literature 7 discloses a method in which a difluorophosphate is produced by bringing a carbonate and phosphorus oxyfluoride into contact with each other. However, phosphorus oxyfluoride to be used as the raw material is expensive and difficult to obtain.

Although Patent Literature 8 discloses a method for self-producing phosphorus oxyfluoride to be used as a raw material, it can be also said that this method is not suitable for industrial production for the reason that the raw materials used in the reaction between calcium phosphate and fluorosulfuric acid are expensive and the yield is low, for example.

Patent Literature 9 discloses a method in which lithium difluorophosphate is produced by bringing hydrogen fluoride into contact with lithium dichlorophosphate that has been synthesized by reacting phosphorous oxychloride with lithium carbonate. However, in this method, plenty of lithium chloride is produced as a by-product when lithium dichlorophosphate is synthesized, and an isolation load is large. Therefore, it is difficult to say that this method is efficient.

Moreover, methods are similarly required in which other difluorophosphates such as sodium difluorophosphate, potassium difluorophosphate, and ammonium difluorophosphate in addition to a lithium salt are efficiently produced in an industrial scale.

CITATION LIST

Patent Literatures

Patent Literature 1: JP H11-67270A
Patent Literature 2: JP 2005-53727A
Patent Literature 3: JP 2005-219994A
Patent Literature 4: JP 2005-306619A
Patent Literature 5: JP 2008-222484A
Patent Literature 6: JP 2010-155774A
Patent Literature 7: JP 2006-143572A
Patent Literature 8: U.S. Pat. No. 3,428,422
Patent Literature 9: JP 2014-015343A

SUMMARY OF INVENTION

Technical Problem

The present invention was achieved in order to solve the foregoing problems, and it is an object thereof to provide a simple method for producing a difluorophosphate that uses only inexpensive raw materials and requires no complicated operations.

Solution to Problem

The inventors of the present invention conducted intensive research in order to solve the foregoing problems. As a result, they found that a difluorophosphate could be obtained at low cost in a simple manner by reacting at least one salt selected from the group consisting of halides, carbonates, borates, phosphates, hydroxides, and oxides of alkali metals, alkali earth metals, and oniums, as a salt to be used as a raw material; one phosphorus compound selected from the group consisting of phosphorous oxychlorides and phosphorus chlorides, as a phosphorus compound to be used as a phosphorus source; water; and hydrogen fluoride, and accomplished the present invention.

That is, the present invention provides a method for producing a difluorophosphate characterized in that at least one salt selected from the group consisting of halides, carbonates, borates, phosphates, hydroxides, and oxides of alkali metals, alkali earth metals, and oniums; one phosphorus compound selected from the group consisting of phosphorous oxychlorides and phosphorus chlorides; water; and hydrogen fluoride are reacted. Aspects [1] to [9] of the present invention described below are provided.

[1] A method for producing a difluorophosphate, comprising:
(1) generating a dichlorophosphate by reacting at least one salt selected from the group consisting of halides, carbonates, borates, phosphates, hydroxides, and oxides of alkali metals, alkali earth metals, and oniums, one phosphorus compound selected from the group consisting of phosphorous oxychlorides and phosphorus chlorides, and water; and
(2) reacting hydrogen fluoride with the dichlorophosphate.

[2] A method for producing a difluorophosphate, comprising:
(1) generating dichlorophosphoric acid by reacting one phosphorus compound selected from the group consisting of phosphorous oxychlorides and phosphorus chlorides, with water;
(2) generating a dichlorophosphate by reacting the dichlorophosphoric acid with at least one salt selected from the group consisting of halides, carbonates, borates, phosphates, hydroxides, and oxides of alkali metals, alkali earth metals, and oniums; and
(3) reacting hydrogen fluoride with the dichlorophosphate.

[3] The method for producing a difluorophosphate as set forth in clause [1] or [2], wherein the hydrogen fluoride is in a form selected from the group consisting of anhydrous hydrogen fluoride, a mixed solution of anhydrous hydrogen fluoride and an organic solvent, and a mixed gas of anhydrous hydrogen fluoride and an inert gas.

[4] The method for producing a difluorophosphate as set forth in any one of clauses [1] to [3], wherein the salt to be used in the reaction is at least one selected from the group consisting of halides, carbonates, borates, phosphates, hydroxides, and oxides of alkali metals.

[5] The method for producing a difluorophosphate as set forth in any one of clauses [1] to [3], wherein the salt to be used in the reaction is at least one selected from the group consisting of halides and carbonates of alkali metals.

[6] The method for producing a difluorophosphate as set forth in any one of clauses [1] to [5], wherein the phosphorus compound is phosphoryl chloride.

[7] The method for producing a difluorophosphate as set forth in any one of clauses [1] to [6], wherein a temperature at which the phosphorus compound and the water are reacted is in a range from −50° C. to 50° C.

[8] The method for producing a difluorophosphate as set forth in any one of clauses [1] to [7], wherein, after the dichlorophosphate is brought into contact with the hydrogen fluoride, a temperature is maintained in a temperature range from 80° C. to 250° C.

[9] The method for producing a difluorophosphate as set forth in any one of clauses [1] to [8], wherein, after the dichlorophosphate is brought into contact with the hydrogen fluoride at a contact temperature in a range from −50° C. to 130° C., a temperature at which a composition of a product converges is controlled to be in a range of 80° C. to 250° C.

Advantageous Effects of Invention

With the method for producing a difluorophosphate according to the present invention, a difluorophosphate having a high purity can be produced in a simple manner using only inexpensive raw materials and without using an expensive hexafluorophosphate.

In the method according to the present invention, hydrogen chloride, which has a low boiling point, is produced as a by-product, and does not remain in the reaction system. Therefore, there is no risk that the difluorophosphate will be degraded by an acid, and a difluorophosphate having a high purity can be obtained. Furthermore, the difluorophosphate can be produced in one pot, and thus this method is industrially advantageous.

Also, with the method according to the present invention, the difluorophosphate is not degraded in the reaction system, and therefore, no problem arises in that the degradation products cause deterioration of the cycle characteristic of the battery and coloring of the electrolyte solution.

DESCRIPTION OF EMBODIMENTS

Hereinafter, a method for producing a difluorophosphate according to the present invention will be described in detail based on preferred embodiments thereof, but the present invention is not limited to the following description.

First, the method for producing a difluorophosphate according to the present invention will be described. The production method according to the present invention is characterized in that at least one salt selected from the group consisting of halides, carbonates, borates, phosphates, hydroxides, and oxides of alkali metals, alkali earth metals, and oniums, as a salt to be used as a raw material; one phosphorus compound selected from the group consisting of phosphorous oxychlorides and phosphorus chlorides, as a phosphorus compound to be used as a phosphorus source; water; and hydrogen fluoride are reacted.

Although details of the reaction mechanism in the present invention are not clear, it is thought that a stepwise reaction as shown in formulae (i) to (iii) below proceeds when a reaction in which the salt to be used as a raw material is lithium chloride (LiCl) and the phosphorus compound is phosphoryl chloride ($POCl_3$) is taken as an example.

Chemical Formula 1

$$POCl_3 + H_2O \rightarrow HPO_2Cl_2 + HCl \quad (i)$$

$$HPO_2Cl_2 + LiCl \rightarrow LiPO_2Cl_2 + HCl \quad (ii)$$

$$LiPO_2Cl_2 + 2HF \rightarrow LiPO_2F_2 + 2HCl \quad (iii)$$

That is, in the production method according to the present invention, substantially all of the phosphorus compound converts into a difluorophosphate as shown in the formulae (i) to (iii) above. In addition, since substantially all of Cl, which is unnecessary for the reaction, converts into HCl and vaporizes, Cl is not contained in the generated difluorophosphate.

When another salt to be used as a raw material is used, a different by-product is produced in the second step (formula (ii) above).

When lithium fluoride (LiF) is used, hydrogen fluoride is produced as a by-product, and when lithium carbonate ($Li_2CO_3$) is used, water and carbonic acid gas are produced as by-products, for example.

Furthermore, as described above, many details of the reaction in which a dichlorophosphate converts into a difluorophosphate are not clear, but it is known that the amount of impurities such as a monochloromonofluorophosphate and a monofluorophosphate is reduced by heating, and the composition converges to a difluorophosphate (convergent synthesis).

Any salt can be used as a raw material (also referred to as "raw material salt" hereinafter) without a particular limitation as long as the salt is of a commercially available grade. However, it is natural that use of a raw material having a high purity makes it possible to obtain a product (generated material) having a high purity without performing a special purification method, and therefore, it is preferable to use a raw material salt having a high purity.

In the present invention, optionally, at least one selected from:
1) halides, carbonates, borates, phosphates, hydroxides, or oxides of alkali metals;
2) halides, carbonates, borates, phosphates, hydroxides, or oxides of alkali earth metals; and
3) halides, carbonates, borates, phosphates, hydroxides, or oxides of oniums can be used as the raw material salt.

Specific examples of the alkali metals include lithium, sodium, potassium, rubidium, and cesium. It is preferable to select lithium, sodium, or potassium from the viewpoint of availability and superiority in cost.

Specific examples of the alkali earth metals include beryllium, magnesium, calcium, strontium, and barium. It is preferable to select magnesium or calcium from the viewpoint of availability, superiority in cost, and safety.

Specific examples of the oniums include ammonium, phosphonium, oxonium, sulfonium, and the like.

Examples of the ammonium include $NH_4^+$, primary ammonium, secondary ammonium, tertiary ammonium, or quaternary ammonium.

Quaternary phosphonium is preferable as the phosphonium. Tertiary sulfonium is preferable as the sulfonium.

Specific examples of the halides include fluorides, chlorides, bromides, and iodides. It is preferable to select fluorides or chlorides from the viewpoint of ease in removing a by-product.

Specific examples of the borates include metaborates, tetraborates, borofluorides, and the like. Orthoborates or metaborates are preferable from the viewpoint of availability and superiority in cost.

Specific examples of the phosphates include phosphates, hydrogenphosphates, dihydrogenphosphates, polyphosphates, hydrogenpolyphosphates, dihydrogenpolyphosphates, phosphenates, metaphosphenates, and the like. Phosphates or dihydrogenphosphates are preferable from the viewpoint of availability and superiority in cost.

Accordingly, out of these compounds, halides, carbonates, borates, phosphates, hydroxides, or oxides of alkali metals are preferable as the raw material salt, and a halide, a carbonate, a phosphate, a borate, a hydroxide, or an oxide of a lithium metal is more preferable. With regard to the type of salt, halides or carbonates are even more preferable.

Lithium fluoride, lithium chloride, or lithium carbonate is most preferable as the raw material salt from the viewpoint of availability and superiority in cost.

Any phosphorus compound can be used as a phosphorus source without particular limitation as long as the compound is of a commercially available grade. However, as described above, use of a raw material having a high purity makes it possible to obtain a product (generated material) having a high purity without performing a special purification method, and therefore, a phosphorus compound having a high purity is preferable.

In the present invention, optionally, at least one selected from the group consisting of phosphorous oxychlorides and phosphorus chlorides can be used as the phosphorus compound.

Specific examples of the phosphorus oxychlorides include phosphoryl chloride, phosphoryl dichloride fluoride, phosphoryl chloride difluoride, diphosphoryl chloride, and the like.

Specific examples of the phosphorus chlorides include phosphorus trichloride, phosphorus pentachloride, and the like.

Phosphoryl chloride, phosphorus trichloride, or phosphorus pentachloride is preferable as the phosphorus compound from the viewpoint of availability and superiority in cost. In particular, out of these compounds, phosphoryl chloride is more preferable.

The production method according to the present invention uses hydrogen fluoride. The hydrogen fluoride can be used in any one form selected from a hydrogen fluoride gas, a mixed gas of hydrogen fluoride and an inert gas, and a mixed solution of hydrogen fluoride and an organic solvent.

In the present invention, use of anhydrous hydrogen fluoride makes it possible to handle the hydrogen fluoride in distinction from water to be added when the reaction is performed, and thus is preferable.

When anhydrous hydrogen fluoride is used, there is no particular limitation on the state of the substance. Anhydrous hydrogen fluoride in a gaseous form or a liquid form may be added.

When the mixed gas of hydrogen fluoride and an inert gas is used, there is no particular limitation on the inert gas as long as the inert gas does not react with hydrogen fluoride and is not involved in the reaction. Specific examples thereof include nitrogen, argon, helium, and the like. Considering superiority in cost, nitrogen is preferable.

When the mixed solution of hydrogen fluoride and an organic solvent is used, there is no particular limitation on the organic solvent as long as the organic solvent does not react with hydrogen fluoride and is not involved in the reaction. Examples thereof include carbonic acid esters, esters, phosphoric acid esters, ethers, nitrile compounds, amide compounds, alcohols, alkanes, and the like. Specific examples thereof include the following compounds.

Examples of the carbonic acid esters include dimethyl carbonate, ethyl methyl carbonate, diethyl carbonate, ethylene carbonate, propylene carbonate, butylene carbonate, and the like. It is preferable to use dimethyl carbonate, ethyl methyl carbonate, diethyl carbonate, ethylene carbonate, or propylene carbonate.

Examples of the esters include methyl acetate, ethyl acetate, butyl acetate, and the like. It is preferable to use ethyl acetate or butyl acetate.

Examples of the phosphoric acid esters include trimethyl phosphate, triethyl phosphate, trimethyl phosphite, diethyl methyl phosphite, and the like.

Examples of the ethers include diethyl ether, dimethoxyethane, tetrahydrofuran, 2-methyltetrahydrofuran, and the like. It is preferable to use dimethoxyethane.

Examples of the nitrile compounds include acetonitrile and the like.

Examples of the amide compounds are dimethylformamide and the like.

Examples of the alcohols include methyl alcohol, ethyl alcohol, butyl alcohol, and the like.

Examples of the alkanes include hexane, n-heptane, and the like.

From the viewpoint of using the above-mentioned organic solvents as an additive for an electrolyte solution for a battery, particularly an additive for an electrolyte solution for a secondary battery, the possibility of organic solvents remaining in the solvent, and the like, the carbonic acid esters and esters are preferable. It is more preferable to use dimethyl carbonate, ethyl methyl carbonate, diethyl carbonate, or dimethoxyethane.

The organic solvents may be used alone or in combination of two or more. When two or more organic solvents are used, it is preferable that a good solvent and a poor solvent for a difluorophosphate are mixed in any given ratio, or the organic solvents are mixed so as to have the same composition as that of the electrolyte solution to be used in a battery.

When hydrogen fluoride is mixed with the inert gas or the organic solvent and introduced, there is no particular limitation on the concentration of the (anhydrous) hydrogen fluoride, but it is preferable that the hydrogen fluoride is mixed therewith at a high concentration from the viewpoint of cost and ease of introduction. Specifically, the concentration is preferably 1% or more, and more preferably 10% or more, and it is even more preferable to use the (anhydrous) hydrogen fluoride at a high concentration of 45% or more.

In the production method according to the present invention, there is no limitation on a method for adding water, and water may be added collectively, added gradually, added divisionally, or added as a mixture of water and any given organic solvent. In particular, from the viewpoint of safety, it is preferable to add water over a period of time. It is preferable to add water gradually or divisionally or as a mixture of water and an organic solvent.

Generally, the remaining phosphorus compound can be removed by purification operations after the reaction, and therefore, an excessive amount of the phosphorus compound may be added. On the other hand, an excessive amount of water can cause the production of a monofluorophosphate as a by-product, but the monofluorophosphate can be removed by purification operations such as washing. Therefore, in the production method according to the present invention, when the reaction in Example 1 in which phosphoryl chloride is used as the phosphorus compound and lithium fluoride is used as the raw material salt is taken as an example, although the feed amounts of the phosphorus compound and water can be set as desired, the amount of water is preferably 1.2 equivalents or less per equivalent of the phosphorus compound, and from the viewpoint of reducing a load on the purification operations, the amount of water is preferably set to 0.95 to 1.05 equivalents, more preferably 0.98 to 1.02 equivalents, and even more preferably 0.99 to 1.01 equivalents. When another phosphorus compound is used, an equivalent of water may be changed in consideration of the type of phosphorus compound and a compound produced as a by-product.

Generally, the remaining raw material salt can be removed by purification operations such as filtration after the reaction, and therefore, a largely excessive amount of the raw material salt may be added. On the other hand, not enough of the raw material salt can cause the production of a dichlorophosphoric acid or the like as a by-product, but an excessive amount of the dichlorophosphoric acid can be removed by the purification operations.

Therefore, in the production method according to the present invention, when the reaction in Example 1 in which phosphoryl chloride is used as the phosphorus compound and lithium fluoride is used as the raw material salt is taken as an example, although the feed amount of the raw material salt can be set as desired, the amount of a salt to be used as a raw material is preferably set to 0.9 equivalents or more per equivalent of the phosphorus compound to be used as a phosphorus source, and from the viewpoint of reducing a load on the purification operations, the amount of the salt is preferably set to 0.95 to 1.35 equivalents, more preferably 1.05 to 1.15 equivalents, and even more preferably 1.09 to 1.11 equivalents. When another raw material salt is used, an equivalent of the raw material salt may be changed in consideration of the type of the raw material salt and a compound produced as a by-product.

Generally, the remaining hydrogen fluoride can be distilled off by heating after the reaction, and therefore, an excessive amount of the hydrogen fluoride may be added. Therefore, in the production method according to the present invention, when the reaction in Example 1 in which phosphoryl chloride is used as the phosphorus compound and lithium fluoride is used as the raw material salt is taken as an example, although the feed amount of the hydrogen fluoride can be set as desired, the amount thereof is preferably set to 1.1 equivalents or more per equivalent of the phosphorus compound, and more preferably 1.2 to 4.0 equivalents. When another raw material is used, an equivalent of the hydrogen fluoride may be changed in consideration of the type of the raw material and a compound produced as a by-product.

In the production method according to the present invention, the phosphorus compound (a) and water (b) are reacted, and then the resulting dichlorophosphoric acid and the raw material salt (c) are reacted to generate a dichlorophosphate. After that, the hydrogen fluoride (d) and the dichlorophosphate are reacted. At this time, the steps of the reaction may be performed separately or collectively in one pot. From the viewpoint of ease of production, it is preferable to perform the steps of the reaction collectively in one pot.

In the production method according to the present invention, there is no particular limitation on the order of addition of the phosphorus compound (a), water (b), the raw material salt (c), and the hydrogen fluoride (d), which are raw materials. These four materials may be mixed simultaneously, or in the order of (a)=1, (b)=2, (c)=3, and (d)=4, or in the order of (a)=1, (b)=3, (c)=2, and (d)=4, or in the order of (a)=2, (b)=3, (c)=1, and (d)=4, or in the order of (a)=2, (b)=1, (c)=3, and (d)=4, or in the order of (a)=3, (b)=1, (c)=2, and (d)=4, or in the order of (a)=3, (b)=2, (c)=1, and (d)=4.

In particular, from the viewpoint of ease of reaction control, the order of (a)=1, (b)=2, (c)=3, and (d)=4, the order of (a)=1, (b)=3, (c)=2, and (d)=4, and the order of (a)=2, (b)=3, (c)=1, and (d)=4 are preferable, and the order of (a)=2, (b)=3, (c)=1, and (d)=4, and the order of (a)=1, (b)=2, (c)=3, and (d)=4 are more preferable.

In the production method according to the present invention, the reaction may be performed without using a solvent or in an appropriate solvent. When a solvent is used, there is no particular limitation on the solvent as long as the solvent is not involved in the reaction. Examples thereof include carbonic acid esters, esters, phosphoric acid esters, ethers, nitrile compounds, amide compounds, alcohols, alkanes, and the like. Specific examples thereof include the following compounds.

Examples of the carbonic acid esters include dimethyl carbonate, ethyl methyl carbonate, diethyl carbonate, ethylene carbonate, propylene carbonate, butylene carbonate, and the like. It is preferable to use dimethyl carbonate, ethyl methyl carbonate, diethyl carbonate, ethylene carbonate, or propylene carbonate.

Examples of the esters include methyl acetate, ethyl acetate, and the like. It is preferable to use ethyl acetate or butyl acetate.

Examples of the phosphoric acid esters include trimethyl phosphate, triethyl phosphate, trimethyl phosphite, diethyl methyl phosphite, and the like.

Examples of the ethers include diethyl ether, dimethoxyethane, tetrahydrofuran, 2-methyltetrahydrofuran, and the like. It is preferable to use dimethoxyethane.

Examples of the nitrile compounds include acetonitrile and the like. Examples of the amide compounds are dimethylformamide and the like.

Examples of the alcohols include methyl alcohol, ethyl alcohol, butyl alcohol, and the like.

Examples of the alkanes include hexane, n-heptane, and the like.

From the viewpoint of using the above-mentioned solvents as an additive for an electrolyte solution for a secondary battery, the possibility of the solvent remaining, and the like, the carbonic acid esters and esters are preferable. It is more preferable to use dimethyl carbonate, ethyl methyl carbonate, diethyl carbonate, or dimethoxyethane. Although there is no particular limitation on the amount of the solvent to be used, the weight of the solvent is preferably one or more times larger, more preferably 2.0 to 10.0 times larger, and even more preferably 2.5 to 5.0 times larger, than the weight of the phosphorus compound.

The above-mentioned solvents may be used alone or in combination of two or more. When two or more solvents are used, it is preferable that a good solvent and a poor solvent for a difluorophosphate are mixed in any given ratio, or the solvents are mixed so as to have the same composition as that of the electrolyte solution to be used in a secondary battery. The solvents may be capable of dissolving the difluorophosphate and the dichlorophosphate, and if the solvents cannot dissolve the difluorophosphate and the dichlorophosphate, it is sufficient if the solvents are used in an amount allowing stirring to be performed.

In the production method according to the present invention, the reaction conditions can be set as desired. Although the temperature at which water and the phosphorus compound are reacted can be set to −50 to 50° C., it is preferable to perform the reaction in a cooled state from the viewpoint of safety. When the organic solvent is used, there is no particular limitation on the reaction temperature as long as the temperature is higher or equal to the melting point, but it is preferable to set the reaction temperature to −50 to 25° C., for example. The reaction temperature can be changed as appropriate depending on the size of the reaction apparatus and the degree of a feed amount. When no solvent is used, it is preferable to set the reaction temperature to −50 to 50° C.

Although the reaction time is usually 10 minutes to 24 hours, a short reaction time is preferable from the viewpoint of reducing the production of a by-product. The reaction time is preferably 10 minutes to 5 hours, and more preferably 10 minutes to 2 hours. The reaction time can be changed as appropriate depending on the size of the reaction apparatus and the degree of a feed amount, thus making it possible to cause the synthesis reaction to converge.

In the production method according to the present invention, the reaction may be performed at atmospheric pressure or reduced pressure. Although the time for adding water and the phosphorus compound can be set as desired, the addition time is preferably 5 minutes or longer, and more preferably 30 minutes or longer. The addition time can be changed as appropriate depending on the size of the reaction apparatus and the degree of a feed amount.

In the production method according to the present invention, the conditions under which the dichlorophosphate is brought into contact with the hydrogen fluoride can be set as desired. Although the temperature at which the dichlorophosphate is brought into contact with the hydrogen fluoride is set to be in a range from −50 to 130° C., the contact temperature is preferably −35 to 60° C., and more preferably −20 to 30° C. The contact temperature can also be changed as appropriate depending on the reaction apparatus and a feed amount.

It is preferable to perform a stirring operation after the dichlorophosphate is brought into contact with the hydrogen fluoride. Although the stirring time is usually 10 minutes to 24 hours, a short reaction time is preferable from the viewpoint of a by-product. Therefore, the stirring time is preferably 10 minutes to 5 hours, and more preferably 10 minutes to 2 hours. The stirring time can also be changed as appropriate depending on the reaction apparatus and a feed amount, and is not limited thereto.

The dichlorophosphate may be brought into contact with the hydrogen fluoride at atmospheric pressure or reduced pressure. It is preferable to perform reflux in order to enhance the contact efficiency and not to allow the hydrogen fluoride to flow out.

In order to allow the composition to converge (allow the synthesis reaction to converge), the reflux is performed while the temperature is maintained at preferably 80 to 250° C., more preferably 100° C. to 200° C., and even more preferably 100° C. to 150° C.

From the viewpoint of a by-product, a short reflux time is preferable. The reflux time is preferably set to 10 minutes to 3 hours, and more preferably 10 minutes to 1 hour.

Although the speed at which a temperature is increased to a target temperature can be set as desired, the temperature is preferably increased at 1 to 200° C./h, and more preferably 10 to 150° C./h. Furthermore, the speed can also be changed as appropriate depending on the reaction apparatus and a feed amount, and favorable conditions can be selected.

The temperature at the bottom of a reflux tower is preferably controlled to −50° C. to 20° C., more preferably −40° C. to 10° C., and even more preferably −30° C. to 5° C.

An undissolved component generated in the reaction liquid can be filtered off by a general filtration operation after the reaction.

The excessive reaction solvent can be removed by a general heating operation, pressure reducing operation, and crystallization and filtration operation. At this time, the heating and drying temperature is preferably 80° C. to 250° C., more preferably 100° C. to 180° C., and even more preferably 110° C. to 150° C.

In the production method according to the present invention, the obtained difluorophosphate can be subjected to a further purification step. There is no particular limitation on the purification method, and a known method such as filtration, washing, and recrystallization can be used. Depending on the purpose, the purity may be enhanced with a chemical treatment such as halogen exchange.

In the filtration, a solvent that can dissolve the difluorophosphate and in which the solubility of the lithium fluoride is low is used. A difluorophosphate having a high purity can be obtained by dissolving the reactant in the solvent, isolating an undissolved portion of the reactant, and removing the solvent using an evaporator or the like.

A solvent in which the solubility of a crude difluorophosphate is low is used to wash the obtained crude difluorophosphate, for example. A difluorophosphate having a high purity can be obtained by using the solvent to wash off impurities.

In the recrystallization, a solvent that can dissolve the difluorophosphate is used, for example, so that temperature dependency of the solubility is used. Crystals of a difluorophosphate having a high purity can be precipitated by dissolving the reactant in the solvent and performing heating and cooling.

There is no particular limitation on the type of solvent to be used in filtration, washing, and recrystallization as long as the solvent does not react with or degrade and degenerate the difluorophosphate and the like. Examples thereof include carbonic acid esters, esters, phosphoric acid esters, ethers, nitrile compounds, amide compounds, alcohols, alkanes, and the like. The examples thereof include the following compounds, but there is no limitation thereto.

Examples of the carbonic acid esters include dimethyl carbonate, ethyl methyl carbonate, diethyl carbonate, ethylene carbonate, propylene carbonate, butylene carbonate, and the like. It is preferable to use dimethyl carbonate, ethyl methyl carbonate, diethyl carbonate, ethylene carbonate, or propylene carbonate.

Examples of the esters include methyl acetate, ethyl acetate, and the like. It is preferable to use ethyl acetate or butyl acetate.

Examples of the phosphoric acid esters include trimethyl phosphate, triethyl phosphate, trimethyl phosphite, diethyl methyl phosphite, and the like.

Examples of the ethers include diethyl ether, dimethoxyethane, tetrahydrofuran, 2-methyltetrahydrofuran, and the like. It is preferable to use dimethoxyethane.

Examples of the nitrile compounds include acetonitrile and the like. Examples of the amide compounds are dimethylformamide and the like.

Examples of the alcohols include methyl alcohol, ethyl alcohol, butyl alcohol, and the like.

Examples of the alkanes include hexane, n-heptane, and the like.

From the viewpoint of using the above-mentioned organic solvents as an additive for an electrolyte solution for a secondary battery, a possibility that the solvent remains, and the like, the carbonic acid esters and esters are preferable. It is more preferable to use dimethyl carbonate, ethyl methyl carbonate, diethyl carbonate, or dimethoxyethane.

The above-mentioned organic solvents may be used alone or in combination of two or more. When two or more solvents are used, it is preferable that a good solvent and a poor solvent for a difluorophosphate are mixed in any given ratio, or the solvents are mixed so as to have the same composition as that of the electrolyte solution to be used in a secondary battery. The solvents may be capable of dissolving the difluorophosphate and the dichlorophosphate, and if the solvents cannot dissolve the difluorophosphate and the dichlorophosphate, it is sufficient if the solvents are used in an amount allowing stirring to be performed.

In the halogen exchange, a halide such as a chloride is reacted with the difluorophosphate in a solvent or without using a solvent, for example, and then the remaining hydrogen fluoride is removed, thus making it possible to obtain a difluorophosphate with a low acid content.

Although there is no particular limitation on the above-mentioned halide, volatile compounds such as thionyl chloride, acetyl chloride, and tetrachlorosilane, and compounds such as lithium chloride and calcium bromide that are poorly soluble in an organic solvent can be easily removed and thus are preferable.

EXAMPLES

Hereinafter, the present invention will be described more specifically by way of examples, but is not particularly limited to these examples. A reaction product was analyzed by $^{19}$F-NMR and $^{31}$P-NMR using NMR system 300 manufactured by Varian. The purity of the product was quantified from the ratio between the integrated values of the product of interest and an internal standard substance (chemical shift value of −166.8 ppm) by $^{19}$F-NMR and $^{31}$P-NMR using hexafluorobenzene as the internal standard substance. Moisture was quantified using MOdel CA-06 manufactured by Mitsubishi Chemical Corporation. A free acid content (HF) was quantified by a neutralization titration using NaOH.

Example 1

25.0 g (0.16 mol) of phosphoryl chloride and 62.5 g of dimethyl carbonate were weighed out and placed into a 250-mL container made of PFA. Subsequently, under a nitrogen seal, 2.9 g (0.16 mol) of pure water was added dropwise over 30 minutes under stirring at 10° C. After the mixture was stirred for 1 hour, it was confirmed by $^{31}$P-NMR that a peak of phosphoryl chloride disappeared and a peak of dichlorophosphoric acid appeared, and then 4.6 g (0.18 mol) of lithium fluoride was added. After the mixture was stirred for 30 minutes, it was confirmed by $^{31}$P-NMR that the peak of dichlorophosphoric acid disappeared and peaks of lithium dichlorophosphate and lithium monochloromonofluorophosphate appeared, and then 17.0 g (0.24 mol in terms of hydrogen fluoride) of 28% solution of hydrogen fluoride in dimethyl carbonate was added, and the resulting mixture was stirred at 10° C. for 30 minutes. Subsequently, the mixture was stirred under a nitrogen seal at 120° C. for 1 hour, and thus the composition converged. Heating was performed at 120° C. for 2 hours to distill off the excessive solvent and reaction by-products. Then, the mixture was cooled to room temperature, and thus 15.9 g of crystals of crude lithium difluorophosphate was obtained. The generation rate of the obtained crystals was calculated by $^{19}$F-NMR and $^{31}$P-NMR. As a result, it was confirmed that the reactions proceeded substantially quantitatively. Subsequently, a purification treatment was performed, and thus 13.2 g of crystals of lithium difluorophosphate was obtained. The acid content value of the obtained crystals calculated by neutralization titration was 50 wtppm or less, and the purity calculated by NMR was 99%.

Example 2

7.6 g (0.18 mol) of lithium chloride, 25.0 g (0.16 mol) of phosphoryl chloride, and 62.5 g of dimethyl carbonate were weighed out and placed into a 250-mL container made of PFA. Subsequently, under a nitrogen seal, 2.9 g (0.16 mol) of pure water was added dropwise over 30 minutes under stirring at 10° C. After the mixture was stirred for 30 minutes, it was confirmed by $^{31}$P-NMR that a peak of lithium dichlorophosphate appeared, and then 68.5 g (0.48 mol in terms of hydrogen fluoride) of 14% solution of hydrogen fluoride in dimethyl carbonate was added, and the resulting mixture was stirred at 10° C. for 30 minutes. Then, the mixture was stirred under a nitrogen seal at 120° C. for 1 hour, and thus the composition converged. Heating was performed at 120° C. for 2 hours to distill off the excessive solvent and reaction by-products. Subsequently, the mixture was cooled to room temperature, and thus 13.2 g of crystals of crude lithium difluorophosphate was obtained. The generation rate of the obtained crystals was calculated by $^{19}$F-NMR and $^{31}$P-NMR. As a result, it was confirmed that the reactions proceeded substantially quantitatively. Subsequently, a purification treatment was performed, and thus 11.4 g of crystals of lithium difluorophosphate was obtained. The acid content value of the obtained crystals calculated by neutralization titration was 50 wtppm or less, and the purity calculated by NMR was 99%.

Example 3

4.6 g (0.18 mol) of lithium fluoride, 25.0 g (0.16 mol) of phosphoryl chloride, and 62.5 g of dimethyl carbonate were weighed out and placed into a 250-mL container made of PFA. Subsequently, under a nitrogen seal, 2.9 g (0.16 mol) of pure water was added dropwise over 30 minutes under stirring at 10° C. After the mixture was stirred for 30 minutes, it was confirmed by $^{31}$P-NMR that peaks of lithium dichlorophosphate and lithium monofluorophosphate appeared, and then 35.0 g (0.25 mol in terms of hydrogen fluoride) of 14% solution of hydrogen fluoride in dimethyl carbonate was added, and the resulting mixture was stirred at 10° C. for 30 minutes. Subsequently, the mixture was stirred under a nitrogen seal at 120° C. for 1 hour, and thus the composition converged. Heating was performed at 120° C. for 2 hours to distill off the excessive solvent and reaction by-products. Then, the mixture was cooled to room temperature, and thus 14.9 g of crystals of crude lithium difluorophosphate was obtained. The generation rate of the obtained crystals was calculated by $^{19}$F-NMR and $^{31}$P-NMR. As a result, it was confirmed that the reactions proceeded substantially quantitatively. Subsequently, a purification treatment was performed, and thus 12.5 g of crystals of lithium difluorophosphate was obtained. The acid content value of the obtained crystals calculated by neutralization titration was 50 wtppm or less, and the purity calculated by NMR was 99%.

Example 4

6.0 g (0.08 mol) of lithium carbonate, 25.0 g (0.16 mol) of phosphoryl chloride, and 62.5 g of dimethyl carbonate were weighed out and placed into a 250-mL container made of PFA. Subsequently, under a nitrogen seal, 1.4 g (0.08 mol) of pure water was added dropwise over 30 minutes under stirring at 10° C. After the mixture was stirred for 30 minutes, it was confirmed by $^{31}$P-NMR that a peak of lithium dichlorophosphate appeared, and then 35.0 g (0.49 mol in terms of hydrogen fluoride) of 28% solution of hydrogen fluoride in dimethyl carbonate was added, and the resulting mixture was stirred at 10° C. for 30 minutes. Then, the mixture was stirred under a nitrogen seal at 120° C. for 1 hour, and thus the composition converged. Heating was performed at 120° C. for 2 hours to distill off the excessive solvent and reaction by-products. Subsequently, the mixture was cooled to room temperature, and thus 14.8 g of crystals of crude lithium difluorophosphate was obtained. The generation rate of the obtained crystals was calculated by $^{19}$F-NMR and $^{31}$P-NMR. As a result, it was confirmed that the reactions proceeded substantially quantitatively. Subsequently, a purification treatment was performed, and thus 12.0 g of crystals of lithium difluorophosphate was obtained. The acid content value of the obtained crystals calculated by neutralization titration was 50 wtppm or less, and the purity calculated by NMR was 99%.

Example 5

4.6 g (0.18 mol) of lithium fluoride, 25.0 g (0.16 mol) of phosphoryl chloride, and 62.5 g of 1,2-dimethoxyethane were weighed out and placed into a 250-mL container made of PFA. Subsequently, under a nitrogen seal, 2.9 g (0.16 mol) of pure water was added dropwise over 30 minutes under stirring at 10° C. After the mixture was stirred for 30 minutes, it was confirmed by $^{31}$P-NMR that peaks of lithium dichlorophosphate and lithium monofluorophosphate appeared, and then 35.0 g (0.49 mol in terms of hydrogen fluoride) of 28% solution of hydrogen fluoride in 1,2-dimethoxyethane was added, and the resulting mixture was stirred at 10° C. for 30 minutes. Then, the mixture was stirred under a nitrogen seal at 110° C. for 1 hour, and thus the composition converged. Heating was performed at 120° C. for 2 hours to distill off the excessive solvent and reaction by-products. Subsequently, the mixture was cooled to room temperature, and thus 11.1 g of crystals of crude lithium difluorophosphate was obtained. The generation rate of the obtained crystals was calculated by $^{19}$F-NMR and $^{31}$P-NMR. As a result, it was confirmed that the reactions proceeded substantially quantitatively. Subsequently, a purification treatment was performed, and thus 9.3 g of crystals of lithium difluorophosphate was obtained. The acid content value of the obtained crystals calculated by neutralization titration was 50 wtppm or less, and the purity calculated by NMR was 99%.

Example 6

4.6 g (0.18 mol) of lithium fluoride, 25.0 g (0.16 mol) of phosphoryl chloride, and 62.5 g of ethyl acetate were weighed out and placed into a 250-mL container made of PFA. Subsequently, under a nitrogen seal, 2.9 g (0.16 mol) of pure water was added dropwise over 30 minutes under stirring at 10° C. After the mixture was stirred for 30 minutes, it was confirmed by $^{31}$P-NMR that peaks of lithium dichlorophosphate and lithium monofluorophosphate appeared, and then 35.0 g (0.49 mol in terms of hydrogen fluoride) of 28% solution of hydrogen fluoride in ethyl acetate was added, and the resulting mixture was stirred at 10° C. for 30 minutes. Subsequently, the mixture was stirred under a nitrogen seal at 120° C. for 1 hour, and thus the composition converged. Heating was performed at 120° C. for 2 hours to distill off the excessive solvent and reaction by-products. Then, the mixture was cooled to room temperature, and thus 15.2 g of crystals of crude lithium difluorophosphate was obtained. The generation rate of the obtained crystals was calculated by $^{19}$F-NMR and $^{31}$P-NMR. As a result, it was confirmed that the reactions proceeded substantially quantitatively. Subsequently, a purification treatment was performed, and thus 11.7 g of crystals of lithium difluorophosphate was obtained. The acid content value of the obtained crystals calculated by neutralization titration was 50 wtppm or less, and the purity calculated by NMR was 99%.

Example 7

4.6 g (0.18 mol) of lithium fluoride, 25.0 g (0.16 mol) of phosphoryl chloride, and 62.5 g of diethyl carbonate were weighed out and placed into a 250-mL container made of PFA. Subsequently, under a nitrogen seal, 2.9 g (0.16 mol) of pure water was added dropwise over 30 minutes under stirring at 10° C. After the mixture was stirred for 30 minutes, it was confirmed by $^{31}$P-NMR that peaks of lithium dichlorophosphate and lithium monofluorophosphate appeared, and then 35.0 g (0.49 mol in terms of hydrogen fluoride) of 28% solution of hydrogen fluoride in diethyl carbonate was added, and the resulting mixture was stirred at 10° C. for 30 minutes. Subsequently, the mixture was stirred under a nitrogen seal at 110° C. for 1 hour, and thus the composition converged. Heating was performed at 120° C. for 2 hours to distill off the excessive solvent and reaction by-products. Then, the mixture was cooled to room temperature, and thus 14.7 g of crystals of crude lithium difluorophosphate was obtained. The generation rate of the obtained crystals was calculated by $^{19}$F-NMR and $^{31}$P-NMR. As a result, it was confirmed that the reactions proceeded substantially quantitatively. Subsequently, a purification treatment was performed, and thus 9.3 g of crystals of lithium difluorophosphate was obtained. The acid content value of the obtained crystals calculated by neutralization titration was 50 wtppm or less, and the purity calculated by NMR was 99%.

Example 8

4.6 g (0.18 mol) of lithium fluoride and 25.0 g (0.16 mol) of phosphoryl chloride were weighed out and placed into a 250-mL container made of PFA. Subsequently, under a nitrogen seal, 2.9 g (0.16 mol) of pure water was added dropwise over 30 minutes under shaking and stirring without using a solvent at 10° C. After the mixture was stirred for 30 minutes, it was confirmed by $^{31}$P-NMR that peaks of lithium dichlorophosphate and lithium monofluorophosphate appeared, and then 35.0 g (0.25 mol in terms of hydrogen fluoride) of 14% solution of hydrogen fluoride in dimethyl carbonate was added, and the resulting mixture was stirred at 10° C. for 30 minutes. Subsequently, the mixture was stirred under a nitrogen seal at 120° C. for 1 hour, and thus the composition converged. Heating was performed at 120° C. for 2 hours to distill off the excessive solvent and reaction by-products. Then, the mixture was cooled to room temperature, and thus 14.2 g of crystals of crude lithium difluorophosphate was obtained. The generation rate of the obtained crystals was calculated by $^{19}$F-NMR and $^{31}$P-NMR. As a result, it was confirmed that the reactions proceeded substantially quantitatively. Subsequently, a purification treatment was performed, and thus 11.4 g of crystals of lithium difluorophosphate was obtained. The acid content value of the obtained crystals calculated by neutralization titration was 50 wtppm or less, and the purity calculated by NMR was 99%.

Example 9

4.6 g (0.18 mol) of lithium fluoride and 25.0 g (0.16 mol) of phosphoryl chloride were weighed out and placed into a 250-mL container made of PFA. Subsequently, under a nitrogen seal, 2.9 g (0.16 mol) of pure water was added dropwise over 30 minutes under shaking and stirring without using a solvent at 10° C. After the mixture was stirred for 30 minutes, it was confirmed by $^{31}$P-NMR that peaks of lithium dichlorophosphate and lithium monofluorophosphate appeared, and then 11.0 g (0.55 mol) of anhydrous hydrogen fluoride was added, and the resulting mixture was stirred at 10° C. for 30 minutes. Subsequently, the mixture was stirred under a nitrogen seal at 130° C. for 1 hour, and thus the composition converged. Heating was performed at 120° C. for 2 hours to distill off the excessive solvent and reaction by-products. Then, the mixture was cooled to room temperature, and thus 14.4 g of crystals of crude lithium difluorophosphate was obtained. The generation rate of the obtained crystals was calculated by $^{19}$F-NMR and $^{31}$P-NMR. As a result, it was confirmed that the reactions proceeded substantially quantitatively. Subsequently, a purification treatment was performed, and thus 11.7 g of crystals of lithium difluorophosphate was obtained. The acid content value of the obtained crystals calculated by neutralization titration was 50 wtppm or less, and the purity calculated by NMR was 99%.

Example 10

4.6 g (0.18 mol) of lithium fluoride, 25.0 g (0.16 mol) of phosphoryl chloride, and 62.5 g of dimethyl carbonate were weighed out and placed into a 250-mL container made of PFA. Subsequently, under a nitrogen seal, 2.9 g (0.16 mol) of pure water was added dropwise over 30 minutes under stirring at 10° C. After the mixture was stirred for 30 minutes, it was confirmed by $^{31}$P-NMR that peaks of lithium dichlorophosphate and lithium monofluorophosphate appeared, and then 11.0 g (0.55 mol) of anhydrous hydrogen fluoride was added, and the resulting mixture was stirred at 10° C. for 30 minutes. Subsequently, the mixture was stirred under a nitrogen seal at 120° C. for 1 hour, and thus the composition converged. Heating was performed at 120° C. for 2 hours to distill off the excessive solvent and reaction by-products. Then, the mixture was cooled to room temperature, and thus 14.4 g of crystals of crude lithium difluorophosphate was obtained. The generation rate of the obtained crystals was calculated by $^{19}$F-NMR and $^{31}$P-NMR. As a result, it was confirmed that the reactions proceeded substantially quantitatively. Subsequently, a purification treatment was performed, and thus 12.7 g of crystals of lithium difluorophosphate was obtained. The acid content value of the obtained crystals calculated by neutralization titration was 50 wtppm or less, and the purity calculated by NMR was 99%.

Example 11

46 g (1.8 mol) of lithium fluoride, 250 g (1.6 mol) of phosphoryl chloride, and 625 g of dimethyl carbonate were weighed out and placed into a 2-L container made of PFA. Subsequently, under a nitrogen seal, 29 g (1.6 mol) of pure water was added dropwise over 30 minutes under stirring at 20° C. After the mixture was stirred for 30 minutes, it was confirmed by $^{31}$P-NMR that peaks of lithium dichlorophosphate and lithium monofluorophosphate appeared, and then 170 g (2.4 mol in terms of hydrogen fluoride) of 28% solution of hydrogen fluoride in dimethyl carbonate was added, and the resulting mixture was stirred at 20° C. for 30 minutes. Subsequently, the mixture was stirred under a nitrogen seal at 120° C. for 1 hour, and thus the composition converged. Heating was performed at 120° C. for 2 hours to distill off the excessive solvent and reaction by-products. Then, the mixture was cooled to room temperature, and thus 140 g of crystals of crude lithium difluorophosphate was obtained. The generation rate of the obtained crystals was calculated by $^{19}$F-NMR and $^{31}$P-NMR. As a result, it was confirmed that the reactions proceeded substantially quantitatively. Subsequently, a purification treatment was performed, and thus 106 g of crystals of lithium difluorophosphate was obtained. The acid content value of the obtained crystals calculated by neutralization titration was 50 wtppm or less, and the purity calculated by NMR was 99%.

Example 12

10.5 g (0.18 mol) of sodium chloride, 25.0 g (0.16 mol) of phosphoryl chloride, and 62.5 g of dimethyl carbonate were weighed out and placed into a 250-mL container made of PFA. Subsequently, under a nitrogen seal, 2.9 g (0.16 mol) of pure water was added dropwise over 30 minutes under stirring at 10° C. After the mixture was stirred for 30 minutes, it was confirmed by $^{31}$P-NMR that a peak of sodium dichlorophosphate appeared, and then 35.0 g (0.25 mol in terms of hydrogen fluoride) of 14% solution of hydrogen fluoride in dimethyl carbonate was added, and the resulting mixture was stirred at 10° C. for 30 minutes. Subsequently, the mixture was stirred under a nitrogen seal at 120° C. for 1 hour, and thus the composition converged. Heating was performed at 100° C. for 2 hours to distill off the excessive solvent and reaction by-products. Then, the mixture was cooled to room temperature, and thus 17.9 g of crystals of crude sodium difluorophosphate was obtained. The generation rate of the obtained crystals was calculated by $^{19}$F-NMR and $^{31}$P-NMR. As a result, it was confirmed that the reactions proceeded substantially quantitatively. Subsequently, a purification treatment was performed, and 15.0 g of crystals of sodium difluorophosphate was obtained. The acid content value of the obtained crystals calculated by neutralization titration was 50 wtppm or less, and the purity calculated by NMR was 99%.

Example 13

10.5 g (0.18 mol) of potassium fluoride, 25.0 g (0.16 mol) of phosphoryl chloride, and 62.5 g of dimethyl carbonate were weighed out and placed into a 250-mL container made of PFA. Subsequently, under a nitrogen seal, 2.9 g (0.16 mol) of pure water was added dropwise over 30 minutes under stirring at 10° C. After the mixture was stirred for 30 minutes, it was confirmed by $^{31}$P-NMR that peaks of potassium dichlorophosphate and potassium monofluorophosphate appeared, and then 35.0 g (0.25 mol in terms of hydrogen fluoride) of 14% solution of hydrogen fluoride in dimethyl carbonate was added, and the resulting mixture was stirred at 10° C. for 30 minutes. Subsequently, the mixture was stirred under a nitrogen seal at 120° C. for 1 hour, and thus the composition converged. Heating was performed at 120° C. for 2 hours to distill off the excessive solvent and reaction by-products. Then, the mixture was cooled to room temperature, and thus 19.0 g of crystals of crude potassium difluorophosphate was obtained. The generation rate of the obtained crystals was calculated by $^{19}$F-NMR and $^{31}$P-NMR. As a result, it was confirmed that the reactions proceeded substantially quantitatively. Subsequently, a purification treatment was performed, and 16.2 g of crystals of potassium difluorophosphate was obtained. The acid content value of the obtained crystals calculated by neutralization titration was 50 wtppm or less, and the purity calculated by NMR was 99%.

Example 14

27.3 g (0.18 mol) of cesium fluoride, 25.0 g (0.16 mol) of phosphoryl chloride, and 62.5 g of dimethyl carbonate were weighed out and placed into a 250-mL container made of PFA. Subsequently, under a nitrogen seal, 2.9 g (0.16 mol) of pure water was added dropwise over 30 minutes under stirring at 10° C. After the mixture was stirred for 30 minutes, it was confirmed by $^{31}$P-NMR that peaks of cesium dichlorophosphate and cesium monofluorophosphate appeared, and then 35.0 g (0.25 mol in terms of hydrogen fluoride) of 14% solution of hydrogen fluoride in dimethyl carbonate was added, and the resulting mixture was stirred at 10° C. for 30 minutes. Subsequently, the mixture was stirred under a nitrogen seal at 120° C. for 1 hour, and thus the composition converged. Heating was performed at 120° C. for 2 hours to distill off the excessive solvent and reaction by-products. Then, the mixture was cooled to room temperature, and thus 29.7 g of crystals of crude cesium difluorophosphate was obtained. The generation rate of the obtained crystals was calculated by $^{19}$F-NMR and $^{31}$P-NMR. As a result, it was confirmed that the reactions proceeded substantially quantitatively. Subsequently, a purification treatment was performed, and 21.9 g of crystals of cesium difluorophosphate was obtained. The acid content value of the obtained crystals calculated by neutralization titration was 50 wtppm or less, and the purity calculated by NMR was 99%.

Example 15

18.7 g (0.18 mol) of lithium dihydrogenphosphate, 25.0 g (0.16 mol) of phosphoryl chloride, and 62.5 g of dimethyl carbonate were weighed out and placed into a 250-mL container made of PFA. Subsequently, under a nitrogen seal, 2.9 g (0.16 mol) of pure water was added dropwise over 30 minutes under stirring at 10° C. After the mixture was stirred for 30 minutes, it was confirmed by $^{31}$P-NMR that a peak of lithium dichlorophosphate appeared, and then 35.0 g (0.25 mol in terms of hydrogen fluoride) of 14% solution of hydrogen fluoride in dimethyl carbonate was added, and the resulting mixture was stirred at 10° C. for 30 minutes. Subsequently, the mixture was stirred under a nitrogen seal at 120° C. for 1 hour, and thus the composition converged. Heating was performed at 120° C. for 2 hours to distill off the excessive solvent and reaction by-products. Then, the mixture was cooled to room temperature, and thus 13.8 g of crystals of crude lithium difluorophosphate was obtained. The generation rate of the obtained crystals was calculated by $^{19}$F-NMR and $^{31}$P-NMR. As a result, it was confirmed that the reactions proceeded substantially quantitatively. Subsequently, a purification treatment was performed, and thus 12.3 g of crystals of lithium difluorophosphate was obtained. The acid content value of the obtained crystals calculated by neutralization titration was 50 wtppm or less, and the purity calculated by NMR was 99%.

Example 16

4.6 g (0.18 mol) of lithium fluoride, 33.3 g (0.16 mol) of phosphorus pentachloride, and 62.5 g of dimethyl carbonate were weighed out and placed into a 250-mL container made of PFA. Subsequently, under a nitrogen seal, 5.9 g (0.33 mol) of pure water was added dropwise over 30 minutes under stirring at 10° C. After the mixture was stirred for 30 minutes, it was confirmed by $^{31}$P-NMR that peaks of lithium dichlorophosphate and lithium monofluorophosphate appeared, and then 35.0 g (0.25 mol in terms of hydrogen fluoride) of 14% solution of hydrogen fluoride in dimethyl carbonate was added, and the resulting mixture was stirred at 10° C. for 30 minutes. Then, the mixture was stirred under a nitrogen seal at 120° C. for 1 hour, and thus the composition converged. Heating was performed at 120° C. for 2 hours to distill off the excessive solvent and reaction by-products. Then, the mixture was cooled to room temperature, and thus 12.4 g of crystals of crude lithium difluorophosphate was obtained. The generation rate of the obtained crystals was calculated by $^{19}$F-NMR and $^{31}$P-NMR. As a result, it was confirmed that the reactions proceeded substantially quantitatively. Subsequently, a purification treatment was performed, and thus 10.7 g of crystals of lithium difluorophosphate was obtained. The acid content value of the obtained crystals calculated by neutralization titration was 50 wtppm or less, and the purity calculated by NMR was 99%.

Example 17

The reactions were performed in the same manner as in Example 4, except that the temperature at which contact was made with hydrogen fluoride was set to −5° C. 15.2 g of crystals of crude lithium difluorophosphate was obtained. The generation rate of the obtained crystals was calculated by $^{19}$F-NMR and $^{31}$P-NMR. As a result, it was confirmed that the reactions proceeded substantially quantitatively. Subsequently, a purification treatment was performed, and thus 11.7 g of crystals of lithium difluorophosphate was obtained. The acid content value of the obtained crystals calculated by neutralization titration was 50 wtppm or less, and the purity calculated by NMR was 99%.

Example 18

The reactions were performed in the same manner as in Example 4, except that the temperature at which contact was made with hydrogen fluoride was set to 100° C. 15.7 g of crystals of crude lithium difluorophosphate was obtained. The generation rate of the obtained crystals was calculated by $^{19}$F-NMR and $^{31}$P-NMR. As a result, it was confirmed that the reactions proceeded substantially quantitatively. Subsequently, a purification treatment was performed, and thus 10.4 g of crystals of lithium difluorophosphate was obtained. The acid content value of the obtained crystals calculated by neutralization titration was 50 wtppm or less, and the purity calculated by NMR was 99%.

Example 19

The reactions were performed in the same manner as in Example 9, except that the hydrogen fluoride (flow rate of 25 mL/min) was diluted with nitrogen (flow rate of 100 mL/min). 13.8 g of crystals of crude lithium difluorophosphate was obtained. The generation rate of the obtained crystals was calculated by $^{19}$F-NMR and $^{31}$P-NMR. As a result, it was confirmed that the reactions proceeded substantially quantitatively. Subsequently, a purification treatment was performed, and thus 11.7 g of crystals of lithium difluorophosphate was obtained. The acid content value of the obtained crystals calculated by neutralization titration was 50 wtppm or less, and the purity calculated by NMR was 99%.

Example 20

25.0 g (0.16 mol) of phosphoryl chloride and 62.5 g of diethyl carbonate were weighed out and placed into a 250-mL container made of PFA. Subsequently, under a nitrogen seal, 1.5 g (0.08 mol) of pure water was added dropwise over 30 minutes under stirring at 25° C. After the mixture was stirred for 1 hour, it was confirmed by $^{31}$P-NMR that a peak of phosphoryl chloride disappeared and a peak of dichlorophosphoric acid appeared, and then 5.9 g (0.08 mol) of lithium carbonate was added. After the mixture was stirred for 30 minutes, it was confirmed by $^{31}$P-NMR that the peak of dichlorophosphoric acid disappeared and a peak of lithium dichlorophosphate appeared, and then 34.2 g (0.48 mol in terms of hydrogen fluoride) of 28% solution of hydrogen fluoride in diethyl carbonate was added, and the resulting mixture was stirred at 25° C. for 30 minutes. Subsequently, the mixture was stirred under a nitrogen seal at 150° C. for 1 hour, and thus the composition converged. Heating was performed at 150° C. for 2 hours to distill off the excessive solvent and reaction by-products. Then, the mixture was cooled to room temperature, and thus 15.7 g of crystals of crude lithium difluorophosphate was obtained. The generation rate of the obtained crystals was calculated by $^{19}$F-NMR and $^{31}$P-NMR. As a result, it was confirmed that the reactions proceeded substantially quantitatively. Subsequently, a purification treatment was performed, and thus 13.3 g of crystals of lithium difluorophosphate was obtained. The acid content value of the obtained crystals calculated by neutralization titration was 50 wtppm or less, and the purity calculated by NMR was 99%.

Example 21

25.0 g (0.16 mol) of phosphoryl chloride and 62.5 g of diethyl carbonate were weighed out and placed into a 250-mL container made of PFA. Subsequently, under a nitrogen seal, 2.9 g (0.16 mol) of pure water was added dropwise over 30 minutes under stirring at 25° C. After the mixture was stirred for 1 hour, it was confirmed by $^{31}$P-NMR that a peak of phosphoryl chloride disappeared and a peak of dichlorophosphoric acid appeared, and then 7.6 g (0.18 mol) of lithium chloride was added. After the mixture was stirred for 30 minutes, it was confirmed by $^{31}$P-NMR that the peak of dichlorophosphoric acid disappeared and a peak of lithium dichlorophosphate appeared, and then 11.1 g (0.55 mol) of anhydrous hydrogen fluoride was added, and the resulting mixture was stirred at 25° C. for 30 minutes. Subsequently, the mixture was stirred under a nitrogen seal at 150° C. for 1 hour, and thus the composition converged. Heating was performed at 150° C. for 2 hours to distill off the excessive solvent and reaction by-products. Then, the mixture was cooled to room temperature, and thus 14.8 g of crystals of crude lithium difluorophosphate was obtained. The generation rate of the obtained crystals was calculated by $^{19}$F-NMR and $^{31}$P-NMR. As a result, it was confirmed that the reactions proceeded substantially quantitatively. Subsequently, a purification treatment was performed, and thus 13.3 g of crystals of lithium difluorophosphate was obtained. The acid content value of the obtained crystals calculated by neutralization titration was 50 wtppm or less, and the purity calculated by NMR was 99%.

Example 22

25.0 g (0.16 mol) of phosphoryl chloride and 62.5 g of diethyl carbonate were weighed out and placed into a 250-mL container made of PFA. Subsequently, under a nitrogen seal, 2.9 g (0.16 mol) of pure water was added dropwise over 30 minutes under stirring at 25° C. After the mixture was stirred for 1 hour, it was confirmed by $^{31}$P-NMR that a peak of phosphoryl chloride disappeared and a peak of dichlorophosphoric acid appeared, and then 7.6 g (0.18 mol) of lithium chloride was added. After the mixture was stirred for 30 minutes, it was confirmed by $^{31}$P-NMR that the peak of dichlorophosphoric acid disappeared and a peak of lithium dichlorophosphate appeared, and then 11.1 g (0.55 mol) of anhydrous hydrogen fluoride was added, and the resulting mixture was stirred at 25° C. for 30 minutes. Subsequently, the mixture was stirred under a nitrogen seal at 150° C. for 1 hour, and thus the composition converged. Heating was performed at 150° C. for 2 hours to distill off the excessive solvent and reaction by-products. Then, the mixture was cooled to room temperature, and thus 12.1 g of crystals of crude lithium difluorophosphate was obtained. The generation rate of the obtained crystals was calculated by $^{19}$F-NMR and $^{31}$P-NMR. As a result, it was confirmed that the reactions proceeded substantially quantitatively. Subsequently, a purification treatment was performed, and thus 9.7 g of crystals of lithium difluorophosphate was obtained. The acid content value of the obtained crystals calculated by neutralization titration was 50 wtppm or less, and the purity calculated by NMR was 99%.

Comparative Example 1

The reactions were performed in the same manner as in Example 3, except that no water was used. 5.9 g of crystals was obtained. In addition, the generation rate of the lithium difluorophosphate was 63%. It could be confirmed from the low yield and the low purity that the reactions proceeded insufficiently.

Comparative Example 2

The reactions were performed in the same manner as in Example 9, except that the temperature at which the composition converged was set to 60° C. When the obtained crystals were analyzed by $^{19}$F-NMR and $^{31}$P-NMR, peaks of lithium dichlorophosphate and lithium monofluorophosphate were observed, and the generation rate of the lithium difluorophosphate was 38%. It could be confirmed from the low purity that the reactions proceeded insufficiently.

Table 1-1 to Table 1-3 show the experimental conditions of Examples 1 to 22 and Comparative Examples 1 and 2. Table 2-1 to Table 2-3 show the results from the crystals of crude difluorophosphate in Examples 1 to 22 and Comparative Examples 1 and 2.

TABLE 1-1

| | Raw materials | | | | | Reaction conditions (° C.) | | |
|---|---|---|---|---|---|---|---|---|
| Ex. and Comp. Ex. | Raw material salt | Phosphorous source | Water | Initially added solvent | Form of HF | Temperature for reaction between phosphorous source and water | Temperature for contact with HF | Temperature for composition convergence |
| Ex. 1 | LiF | POCl$_3$ | Yes | DMC | 28% HF/DMC | 10 | 10 | 120 |
| Ex. 2 | LiCl | POCl$_3$ | Yes | DMC | 14% HF/DMC | 10 | 10 | 120 |
| Ex. 3 | LiF | POCl$_3$ | Yes | DMC | 14% HF/DMC | 10 | 10 | 120 |
| Ex. 4 | Li$_2$CO$_3$ | POCl$_3$ | Yes | DMC | 28% HF/DMC | 10 | 10 | 120 |
| Ex. 5 | LiF | POCl$_3$ | Yes | DME | 28% HF/DME | 10 | 10 | 110 |
| Ex. 6 | LiF | POCl$_3$ | Yes | AcOEt | 28% HF/AcOEt | 10 | 10 | 120 |
| Ex. 7 | LiF | POCl$_3$ | Yes | DEC | 28% HF/DEC | 10 | 10 | 110 |
| Ex. 8 | LiF | POCl$_3$ | Yes | No | 14% HF/DMC | 10 | 10 | 120 |
| Ex. 9 | LiF | POCl$_3$ | Yes | No | Anhydrous HF | 10 | 10 | 130 |
| Ex. 10 | LiF | POCl$_3$ | Yes | DMC | Anhydrous HF | 10 | 10 | 120 |

TABLE 1-2

| | Raw materials | | | | Reaction conditions (° C.) | | |
|---|---|---|---|---|---|---|---|
| Ex. and Comp. Ex. | Raw material salt | Phosphorous source | Water | Initially added solvent | Form of HF | Temperature for reaction between phosphorous source and water | Temperature for contact with HF | Temperature for composition convergence |
| Ex. 11 | LiF | POCl$_3$ | Yes | DMC | 28% HF/DMC | 20 | 20 | 120 |
| Ex. 12 | NaCl | POCl$_3$ | Yes | DMC | 14% HF/DMC | 10 | 10 | 100 |
| Ex. 13 | KF | POCl$_3$ | Yes | DMC | 14% HF/DMC | 10 | 10 | 120 |
| Ex. 14 | CsF | POCl$_3$ | Yes | DMC | 14% HF/DMC | 10 | 10 | 120 |
| Ex. 15 | LiH$_2$PO$_4$ | POCl$_3$ | Yes | DMC | 14% HF/DMC | 10 | 10 | 120 |
| Ex. 16 | LiF | PCl$_5$ | Yes | DMC | 14% HF/DMC | 10 | 10 | 120 |
| Ex. 17 | Li$_2$CO$_3$ | POCl$_3$ | Yes | DMC | 28% HF/DMC | 10 | −5 | 120 |
| Ex. 18 | Li$_2$CO$_3$ | POCl$_3$ | Yes | DMC | 28% HF/DMC | 10 | 100 | 120 |
| Ex. 19 | LiF | POCl$_3$ | Yes | No | Anhydrous HF diluted with N$_2$ | 10 | 10 | 130 |
| Ex. 20 | Li$_2$CO$_3$ | POCl$_3$ | Yes | DEC | 28% HF/DEC | 25 | 25 | 150 |

TABLE 1-3

| | Raw materials | | | | Reaction conditions (° C.) | | |
|---|---|---|---|---|---|---|---|
| Ex. and Comp. Ex. | Raw material salt | Phosphorous source | Water | Initially added solvent | Form of HF | Temperature of reaction between phosphorous source and water | Temperature of contact with HF | Temperature for composition convergence |
| Ex. 21 | LiCl | POCl$_3$ | Yes | DEC | Anhydrous HF | 25 | 25 | 150 |
| Ex. 22 | LiCl | POCl$_3$ | Yes | No | Anhydrous HF | 25 | 25 | 150 |
| Comp. Ex. 1 | LiF | POCl$_3$ | No | DMC | 14% HF/DMC | 10 | 10 | 120 |
| Comp. Ex. 2 | LiF | POCl$_3$ | Yes | No | Anhydrous HF | 10 | 10 | 60 |

TABLE 2-1

| | Results from crude difluorophosphates | | | | | | |
|---|---|---|---|---|---|---|---|
| | Crude | Acid | | Generation rate (%) | | | |
| Ex. and Comp. Ex. | yield (%) | content (wtppm) | Moisture (wtppm) | Difluoro-phosphate | Monofluoro-phosphate | Hexafluoro-phosphate | Dichloro-phosphate |
| Ex. 1 | 92 | 6157 | 66 | 98 | 2 | ND | ND |
| Ex. 2 | 76 | 7979 | 48 | 98 | 2 | ND | ND |
| Ex. 3 | 86 | 5888 | 52 | 99 | 1 | ND | ND |
| Ex. 4 | 86 | 8175 | 60 | 95 | 5 | ND | ND |
| Ex. 5 | 64 | 6751 | 38 | 87 | 13 | ND | ND |
| Ex. 6 | 88 | 4782 | 31 | 93 | 7 | ND | ND |
| Ex. 7 | 85 | 8913 | 52 | 94 | 6 | ND | ND |
| Ex. 8 | 82 | 7256 | 55 | 88 | 12 | ND | ND |
| Ex. 9 | 83 | 4732 | 51 | 96 | 4 | ND | ND |
| Ex. 10 | 83 | 6964 | 63 | 95 | 5 | ND | ND |

TABLE 2-2

| | Results from crude difluorophosphates | | | | | | |
|---|---|---|---|---|---|---|---|
| | Crude | Acid | | Generation rate (%) | | | |
| Ex. and Comp. Ex. | yield (%) | content (wtppm) | Moisture (wtppm) | Difluoro-phosphate | Monofluoro-phosphate | Hexafluoro-phosphate | Dichloro-phosphate |
| Ex. 11 | 90 | 13557 | 47 | 98 | 2 | ND | ND |
| Ex. 12 | 81 | 9087 | 67 | 89 | 11 | ND | ND |
| Ex. 13 | 85 | 6548 | 76 | 91 | 9 | ND | ND |

TABLE 2-2-continued

| | | | Results from crude difluorophosphates | | | | |
|---|---|---|---|---|---|---|---|
| | Crude | Acid | | Generation rate (%) | | | |
| Ex. and Comp. Ex. | yield (%) | content (wtppm) | Moisture (wtppm) | Difluoro-phosphate | Monofluoro-phosphate | Hexafluoro-phosphate | Dichloro-phosphate |
| Ex. 14 | 79 | 7483 | 44 | 98 | 2 | ND | ND |
| Ex. 15 | 80 | 1158 | 67 | 87 | 13 | ND | ND |
| Ex. 16 | 72 | 27384 | 20 | 85 | 15 | ND | ND |
| Ex. 17 | 88 | 4931 | 61 | 82 | 18 | ND | ND |
| Ex. 18 | 91 | 8236 | 172 | 91 | 9 | ND | ND |
| Ex. 19 | 80 | 4195 | 78 | 94 | 6 | ND | ND |
| Ex. 20 | 91 | 8938 | 142 | 97 | 3 | ND | ND |

The invention claimed is:

1. A method for producing a difluorophosphate, comprising:
   (1) generating a dichlorophosphate by reacting at least one salt selected from the group consisting of halides, carbonates, borates, phosphates, hydroxides, and oxides of alkali metals, alkali earth metals, and oniums, one phosphorus compound selected from the group consisting of phosphorous oxychlorides and phosphorus chlorides, and water; and
   (2) reacting hydrogen fluoride with the dichlorophosphate, and after the dichlorophosphate is brought into contact with the hydrogen fluoride, a temperature at which a composition of a product converges is controlled to be in a range of 80° C. to 250° C.

2. The method for producing a difluorophosphate according to claim 1, wherein the phosphorus compound is phosphoryl chloride.

3. The method for producing a difluorophosphate according to claim 1, wherein a temperature at which the phosphorus compound and the water are reacted is in a range from −50° C. to 50° C.

4. The method for producing a difluorophosphate according to claim 1, wherein the salt to be used in the reaction is at least one selected from the group consisting of halides, carbonates, borates, phosphates, hydroxides, and oxides of alkali metals.

5. The method for producing a difluorophosphate according to claim 4, wherein the phosphorus compound is phosphoryl chloride.

6. The method for producing a difluorophosphate according to claim 4, wherein a temperature at which the phosphorus compound and the water are reacted is in a range from −50° C. to 50° C.

7. The method for producing a difluorophosphate according to claim 1, wherein the salt to be used in the reaction is at least one selected from the group consisting of halides and carbonates of alkali metals.

8. The method for producing a difluorophosphate according to claim 7, wherein the phosphorus compound is phosphoryl chloride.

9. The method for producing a difluorophosphate according to claim 1, wherein, after the dichlorophosphate is brought into contact with the hydrogen fluoride at a contact temperature in a range from −50° C. to 130° C., a temperature at which a composition of a product converges is controlled to be in a range of 80° C. to 250° C.

10. The method for producing a difluorophosphate according to claim 1, wherein the hydrogen fluoride is in a form selected from the group consisting of anhydrous hydrogen fluoride, a mixed solution of anhydrous hydrogen fluoride and an organic solvent, and a mixed gas of anhydrous hydrogen fluoride and an inert gas.

11. The method for producing a difluorophosphate according to claim 10, wherein the salt to be used in the reaction is at least one selected from the group consisting of halides, carbonates, borates, phosphates, hydroxides, and oxides of alkali metals.

12. The method for producing a difluorophosphate according to claim 10, wherein the salt to be used in the reaction is at least one selected from the group consisting of halides and carbonates of alkali metals.

13. The method for producing a difluorophosphate according to claim 10, wherein the phosphorus compound is phosphoryl chloride.

14. The method for producing a difluorophosphate according to claim 10, wherein a temperature at which the phosphorus compound and the water are reacted is in a range from −50° C. to 50° C.

15. A method for producing a difluorophosphate, comprising:
   (1) generating dichlorophosphoric acid by reacting one phosphorus compound selected from the group consisting of phosphorous oxychlorides and phosphorus chlorides, with water;
   (2) generating a dichlorophosphate by reacting the dichlorophosphoric acid with at least one salt selected from the group consisting of halides, carbonates, borates, phosphates, hydroxides, and oxides of alkali metals, alkali earth metals, and oniums; and
   (3) reacting hydrogen fluoride with the dichlorophosphate, and after the dichlorophosphate is brought into contact with the hydrogen fluoride, a temperature at which a composition of a product converges is controlled to be in a range of 80° C. to 250° C.

16. The method for producing a difluorophosphate according to claim 15, wherein the hydrogen fluoride is in a form selected from the group consisting of anhydrous hydrogen fluoride, a mixed solution of anhydrous hydrogen fluoride and an organic solvent, and a mixed gas of anhydrous hydrogen fluoride and an inert gas.

17. The method for producing a difluorophosphate according to claim 15, wherein the salt to be used in the reaction is at least one selected from the group consisting of halides, carbonates, borates, phosphates, hydroxides, and oxides of alkali metals.

18. The method for producing a difluorophosphate according to claim 15, wherein the salt to be used in the reaction is at least one selected from the group consisting of halides and carbonates of alkali metals.

19. The method for producing a difluorophosphate according to claim 15, wherein the phosphorus compound is phosphoryl chloride.

20. The method for producing a difluorophosphate according to claim 15, wherein a temperature at which the phosphorus compound and the water are reacted is in a range from −50° C. to 50° C.

* * * * *